Oct. 27, 1964     A. HARRIS     3,154,102
DISTRIBUTION MANIFOLD
Filed Jan. 11, 1963
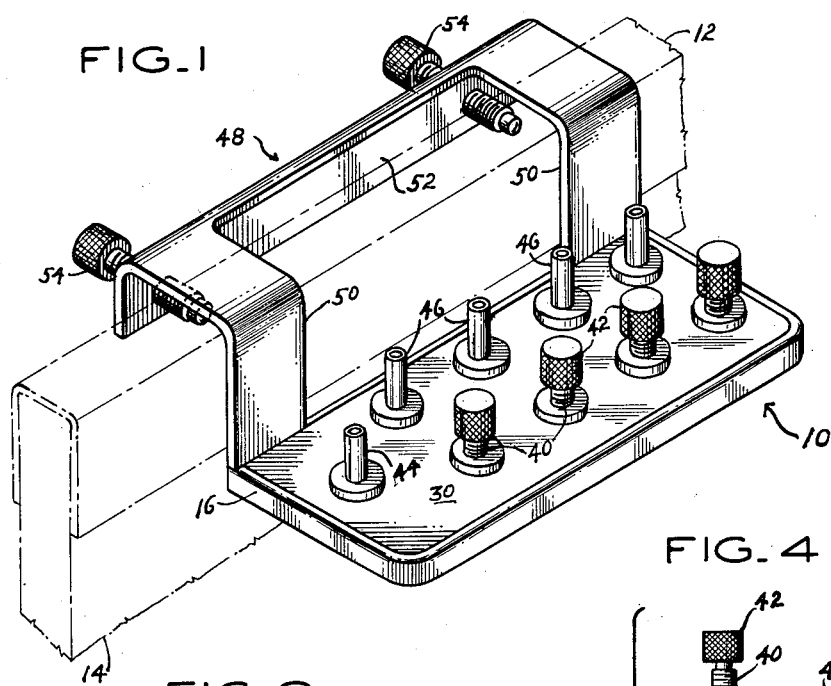
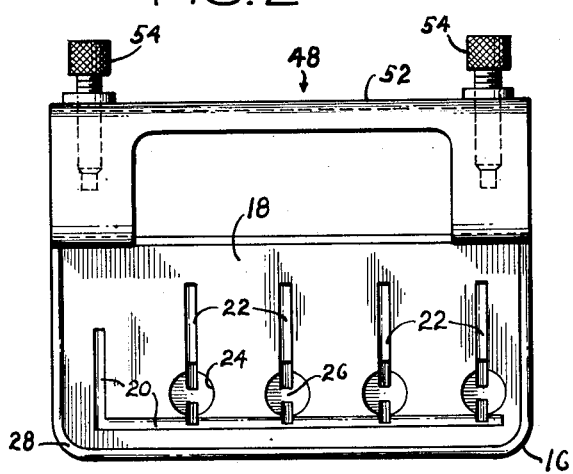
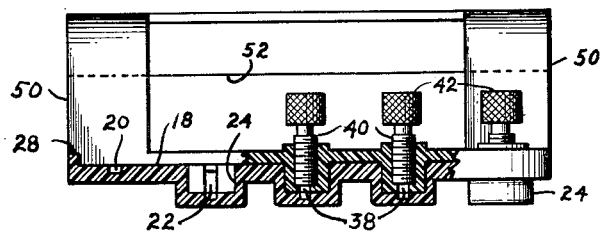
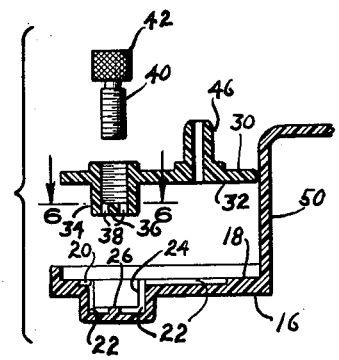
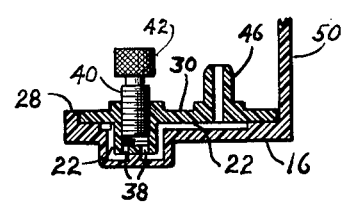
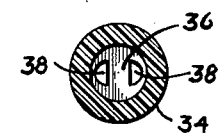

United States Patent Office 3,154,102
Patented Oct. 27, 1964

3,154,102
DISTRIBUTION MANIFOLD
Arthur Harris, 341 1st Ave., New York, N.Y.
Filed Jan. 11, 1963, Ser. No. 250,925
4 Claims. (Cl. 137—608)

This invention relates generally to a manifold for distributing a fluid from a source to several different locations in a manner whereby the flow to each location may be individually controlled with the invention being particularly directed to such a manifold for distributing low pressure air to various locations in a home aquarium or to several different aquarium tanks.

In a distribution manifold for use with home aquariums in order to provide several independently controllable streams of air from a common source it is essential that the device be extremely economical and that it be simple and reliable in operation. In order to achieve economy the design of the device must lend itself to simple manufacturing processes that permit manufacturing in quantity at minimum cost. In order to insure satisfactory operation of the device it should have a minimum of operating parts and be of a material that is not deleteriously effected by exposure to moisture.

These objectives are achieved with the present invention wherein the manifold is made entirely of plastic and is of a design wherein relatively inexpensive molding processes may be employed for its manufacture.

In accordance with the invention the manifold is comprised of a pair of elongated members having generally flat, complementary, overlying surfaces that are pressed into engagement and sealed together during the manufacturing process. The base or lower member of these two has formed in its upper surface a main air passage to which air is supplied and which extends longitudinally of this member. Extending laterally from this main air passage are a number of branch passages, each of which is interrupted intermediate its length. This interruption takes place at the base or bottom of a depression formed in the base member in line with each branch passage, with these depressions being for the purpose of receiving a valve mechanism that forms part of the upper portion of the distribution manifold that overlies said base. Extending from the rear edge of the base is a U shaped bracket adapted to fit over the edge of an aquarium and carrying screw threaded clamp members for firmly clamping the manifold to the aquarium tank. The upper portion or half of the manifold carries the valve mechanism for individually controlling the passage of air through each of the branch passages and it also carries the nozzles for attachment to the air supply hose and the air distribution hoses. The valve mechanism includes a body portion that snugly fits within and sealingly engages the depressions formed in the base portion with this body portion having openings that communicate with the two interrupted portions of the branch passage. Threadedly received in the valve body is a valve member which is provided with an actuating knob disposed above the upper portion of the manifold. This valve member is effective when moved to an innermost position to prevent communication between said interrupted portions of the branch passages and accordingly prevent the passage of air from the main air passage through the branch passages but when moved back from said innermost position permitting such communication and accordingly the passage of air through the branch passages.

Accordingly, it is an object of this invention to provide an improved distribution manifold for controllably distributing a fluid from a common supply to several separate locations.

Another object of this invention is to provide an improved distribution manifold fabricated entirely of plastic material and for use in distributing low pressure air in aquariums.

Still another object of this invention is to provide such a distribution manifold which is extremely simple in its design being economic to manufacture and yet reliable and satisfactory in operation.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIGURE 1 is a perspective view of the distribution manifold of the present invention;

FIGURE 2 is a top elevational view of the base or lower portion of the distribution manifold;

FIGURE 3 is a front view of the distribution manifold, partly in section and with some of the elements removed in order to provide a better understanding of the invention;

FIGURE 4 is an exploded view of the distribution manifold of the invention;

FIGURE 5 is a sectional view looking from the side with a portion of the mounting bracket being broken away; and, FIGURE 6 is an enlarged detailed sectional view taken generally along line 6—6 of FIGURE 4.

Referring now to the drawing, wherein like reference characters are used throughout to designate like elements, the illustrative and preferred embodiment depicted therein shows the distribution manifold, designated generally 10, mounted on the rim 12 of an aquarium tank 14. The base 16 of the manifold is provided with an upwardly facing, generally flat surface 18 within which is formed the air supply or main passage 20, and the branch passages 22 which extend laterally from the main passage. In the path of each of the branch passages there is formed in the base member a depression 24, cylindrical in transverse section in the illustrative embodiment, and provided at its lower region or bottom with a bridge or dam 26 which interrupts each of the branch passageways 22. Thus, each of the branch passageways 22 extends vertically downward along the inside of the depression and thence along the bottom to the bridge 26 whereupon it is interrupted and then it continues along the bottom up the other side and then along the upper surface of the base 16.

The base 16 is provided with an upstanding rim or lip 28 within which is received the upper portion or half 30 of the manifold assembly. This upper portion has a downwardly directed generally flat surface 32 which is in overlying engagement with the surface 18 of the base 16 and extending down from this upper portion are the valve bodies 34 equal in number to the depressions 24 and of complementary configuration with these depressions being received therewithin and sealingly engaging the walls thereof. The outer surface of these valve bodies 34 engage the inner surface of the recesses 24 so that the only passage therebetween is that afforded by the passage 22. The lower end of the valve bodies 24 are provided with a portion or bridge 36 that is complementary with the bridge 26 and sealingly engages the same when the upper portion 30 and the base 16 are in their assembled relation. On each side of the bridge 36 there is provided openings 38 which effectively straddle the bridge 26 and thus communicate with the passageway 22 on each side of this bridge.

Threadedly received in the valve body 34 is the valve member 40, the inner end of which is generally flat so that when the valve member is screwed inwardly to its innermost position it sealingly engages the inner end of the valve body and effectively seals the openings 38 thereby preventing the passage of air through the branch passage 22 while when it is backed away from its innermost position such passage of air is permitted. The outer end of the valve member 40 is formed or provided with a knurled or otherwise roughened knob or the like 42 for manipulation of the valve member to and from its shut off position.

For ease of manufacture the inner end of the valve body is preferably formed as a separate member in the nature of a ring containing the two openings 38 and the bridge 36 with this ring being received in an annular recess formed at the lower end of the valve body up against a shoulder and sealed in place.

Air is supplied to the manifold from a source such as a pump through the nipple or connector 44 which is formed on and is part of the upper portion 36 while air is distributed from each of the branch passageways 22 to corresponding nipples or connectors 46 which likewise are formed on and are part of the upper portion 30 with each of these nipples being cylindrical and elongated in order that a hose may be telescoped thereover.

It will be noted that the valve member and the outlet nipple associated with each branch passage are in lateral alignment and that these nipples and valves are on the upper face or portion of the manifold so that operation is simplified with it being readily apparent what valve controls the passage of air out through what nipple and with the valves being readily accessible.

In assembling the manifold of the present invention the complementary and engaging surfaces of the upper and lower portions are coated with a solvent which reacts with the plastic material so that when these portions of the assembly are forced together they bond together and a seal is provided. After thus coating these overlying and engaging surfaces the upper portion 30 and the base portion 16 are firmly pressed together. Since the depending valve bodies 34 are received within the depressions 24 these members are self-aligning in that when the upper portion and the base portion of the assembly are forced together these portions will be telescoped and accordingly will align themselves with the plastic giving sufficiently to achieve this without requiring extreme accuracy in the manufacture. When the members of the assembly are thus assembled the only passage for air is that of the main passage 20 and the branch passages 22, with flow through each of the branch passages being controlled by the valve means of the invention.

The manifold assembly is mounted upon the rim of the aquarium by the mounting bracket 48 which is generally U shaped in nature having end portions 50 which extend upwardly from and are formed as part of the base 16 with member 52 interconnecting these end portions and having threadedly received therein the clamp members 54 whereby the manifold assembly may be securely clamped in place over the rim of the aquarium tank.

Since the manifold assembly of the invention is made entirely of plastic material it may be manufactured in quantity by means of relatively inexpensive molding techniques with the plastic material, of course, being unaffected by moisture. Moreover, the design of the manifold is such that it has a minimum of parts and accordingly is very low in cost. However, notwithstanding its simplicity, it is extremely satisfactory in its operation being both easy to operate and effective for the purpose intended.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. A plastic air distributing manifold for use with aquariums and the like comprising:
   (a) An elongated base member having a generally flat upper surface within which is formed an upwardly open longitudinally extending main air passage and branch passages laterally extending therefrom;
   (b) said base member being formed with a depression therein in the path of each branch passage with means in said depression interrupting said branch passage;
   (c) an upper member, the lower surface of which is complementary with the upper surface of the base member and sealingly engages the same;
   (d) valve means depending from said upper member for independently controlling each branch passage and having
      (1) a valve body complementary with and sealingly received in said depressions and providing a passage bridging said interrupting means,
      (2) a valve member movable between a blocking position preventing communication past said interrupting means and a position providing such communication and having an operating portion extending upwardly from said upper member;
   (e) nozzles extending upwardly from said upper member with one such nozzle communicating with the main air passage and one communicating with each branch passage generally at the distil end thereof.

2. The plastic air distributing manifold of claim 1 including a U-shaped bracket for receiving the rim of an aquarium or the like and carrying threaded clamp means operative to clamp the same to the aquarium.

3. A plastic air distributing manifold for use with aquariums and the like comprising:
   (a) an elongated base member having a generally flat upper surface within which is formed an upwardly open longitudinally extending main air passage and branch passages laterally extending therefrom;
   (b) said base member being formed with separate depressions therein in the path of each passage with a narrow bridge provided at the bottom thereof interrupting each branch passage;
   (c) an upper member, the lower surface of which is complementary with the upper surface of the base member and sealingly engages the same;
   (d) valve means depending from said upper member for independently controlling each branch passage and having
      (1) a valve body complementary with and sealingly received in said depressions and having a pair of openings separated by a bridge portion that sealingly engages the first mentioned bridge,
      (2) a valve member threadedly received in said body and extending upwardly therefrom with an actuating knob provided at its upper end, said valve member sealingly engaging said openings when moved to its innermost position and establishing communication therebetween when moved away from such position;

(e) nozzles extending upwardly from said upper member with one such nozzle communicating with the main air passage and one communicating with each branch passage generally at the distil end thereof.

4. The plastic air distributing manifold of claim 3 including a U-shaped bracket for receiving the rim of an aquarium or the like and carrying threaded clamp means operative to clamp the same to the aquarium.

References Cited by the Examiner
UNITED STATES PATENTS

| | | | |
|---|---|---|---|
| 1,645,470 | 10/27 | Alheit | 248—226.1 XR |
| 2,613,082 | 10/52 | Guild | 137—608 |
| 2,871,886 | 2/59 | Obreski | 138—111 |
| 3,019,815 | 2/62 | Lenardon | 137—612.1 |
| 3,117,587 | 1/64 | Willinger | 137—608 |

ISADOR WEIL, *Primary Examiner.*